Aug. 12, 1969    F. C. STAKEL    3,460,670
STACKED FLUTED-WALL RECEPTACLES
Filed Jan. 21, 1965    2 Sheets-Sheet 2
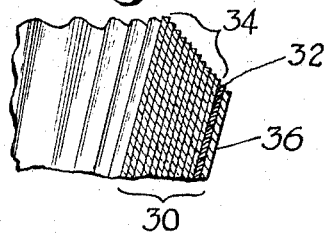
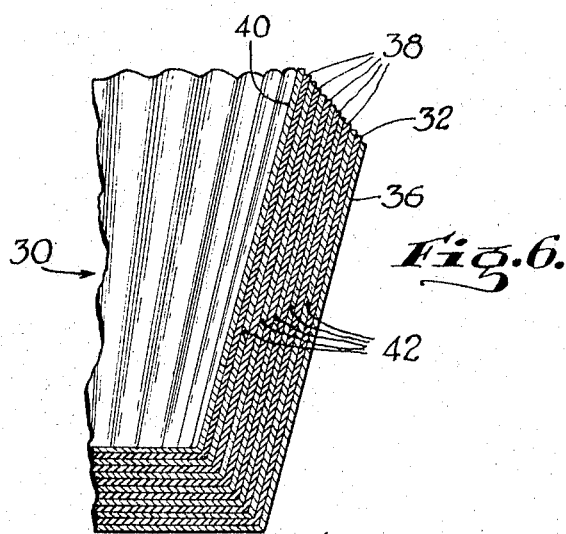
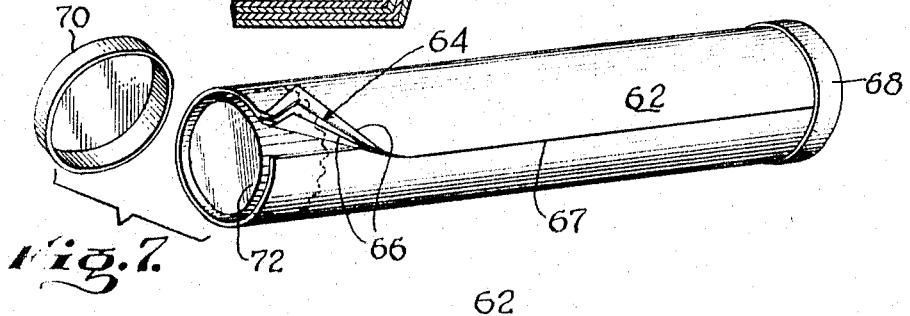
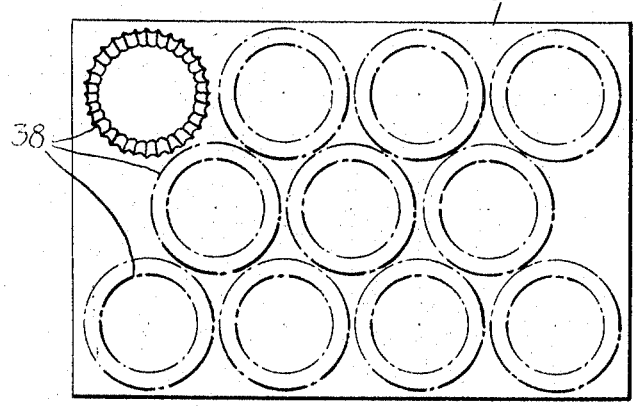
INVENTOR.
FREDERICK C. STAKEL
BY
Robert H. Ware
ATTORNEY United States Patent Office 3,460,670
Patented Aug. 12, 1969

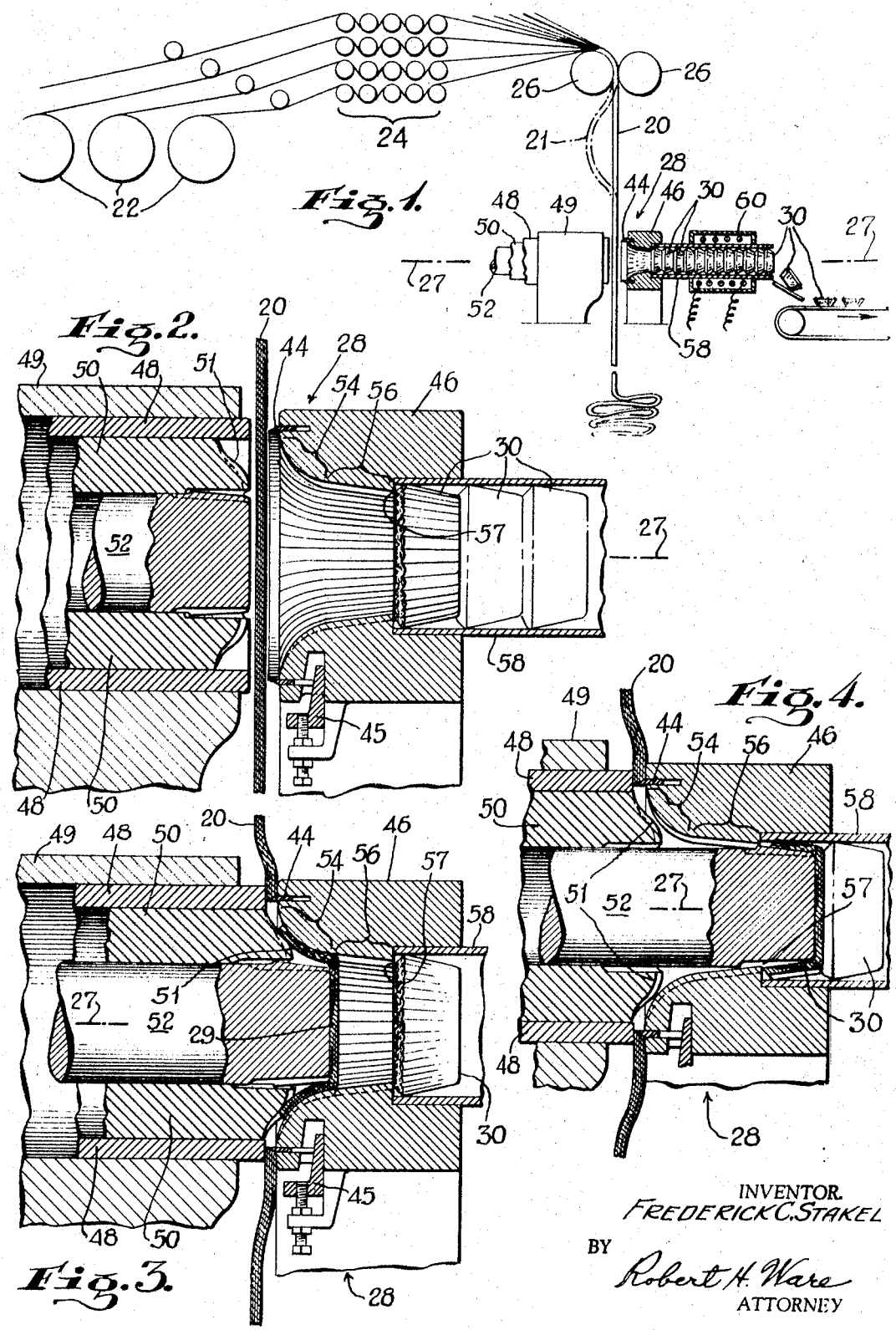

3,460,670
STACKED FLUTED-WALL RECEPTACLES
Frederick C. Stakel, 31 Ramhorne Road,
New Canaan, Conn. 06840
Filed Jan. 21, 1965, Ser. No. 426,918
Int. Cl. B65d 85/60
U.S. Cl. 206—65                                    2 Claims

ABSTRACT OF THE DISCLOSURE

Nested stacks of concave fluted wall cup-shaped receptacles such as baking cups, candy cups and the like, die formed from stacked layers of non-adherent sheet material, incorporating at least one layer, and optionally having each alternate layer, formed of metallic foil, providing a stiff, moisture-resisting assembly tending to avoid the flattening sagging encountered with nested fluted paper cups, and processes for producing these nested stacked receptacles.

---

This invention relates to stacked fluted-wall receptacles, such as cups, trays, candy cups and the like, and particularly to the fluted baking cups fabricated, packed and sold in stacks, to be separated and used by the ultimate consumer.

Conventional baking cups, particularly those formed of thin fluted paper or like material, exhibit extremely poor shape-retention characteristics. Such fluted receptables are concave by virtue of the tapered, "corrugated" flutes accordion-pleating their peripheries into upstanding fluted walls. With the passage of time, such stacked fluted paper baking cups generally tend to return to the original configuration of the thin sheet "webs" from which they are initially stamped. Such cups tend to spread, and they take the peripheral shape of the hexagonal packages in which they are generally packed. Conventional baking cups must be supported in the cavities of muffin tins before they can be filled with batter if they are expected to retain their shape during baking.

The sagging and flattening of fluted paper receptacles, such as paper baking cups and candy cups, is caused either by their absorption of water vapor or moisture, or by their resilient "memory" of their original sheet configuration which produces a gradual flattening return to this configuration with the passage of time, or merely by their inherent lack of stiffness and rigidity.

When sheet metal such as aluminum foil is formed into a fluted cup or tray shape, it is stressed beyond its elastic limit in the region of the flutes and accordingly exhibits no tendency to return to its original flat sheet form. Furthermore, such metallic foil does not absorb water vapor from the atmosphere, and damp atmospheres produce no sagging or loss of shape in fluted metal foil cups.

The attractive appearance and good shape-retention of thin metallic foil make it a highly desirable material for fluted serving trays, candy cups and the like, and its good heat transmission characteristics make it an excellent material for disposable cooking receptacles such as baking cups. However, the fabrication of thin metallic sheet material into cup-like shapes has been prevented in the past by several manufacturing problems. Thick foil plates and pans can be stamped, fluted or formed in the desired shapes from such material as aluminum foil from 0.002″ to 0.005″ thick, for example, but they are too expensive to use as disposable trays or baking cups. Suitably thin metallic foil, less than 0.002″ in thickness for example, generally tears when stamped into fluted cup configuration since the high stresses produced by the fluting dies are concentrated in the bends or "inflexions" bounding the flutes. Furthermore, it has been impractical to stamp stacked metallic foil sheets into stacks of fluted cups because of the swaging or jamming together of the resulting cups, making it impossible to separate them from the fluting dies or from each other without tearing.

Accordingly, it is an object of the invention to provide methods for the fabrication of fluted receptacles tending to maintain them in their fluted concave configuration until they are used by the consumer.

Another object is to provide stacks of fluted cups which are unaffected by water vapor in the ambient atmosphere.

A further object is to provide methods for the production of fluted baking cups which may be used on baking sheets, without any need for recessed-cavity muffin tins.

Another object is to provide methods for the production of fluted cups from thin sheet metallic foil.

A further object is to provide methods for the production of unitary stacks of fluted cups which are capable of easy separation by the user, with one or more of the cups in each stack being formed of thin metallic foil.

Another object is to provide a combination food package incorporating a food product, baking cups and a baking sheet in a single, convenient disposable package.

Other and more specific objects will be apparent from the features, elements, combinations and operating procedures disclosed in the following detailed description and shown in the drawings, in which:

FIGURE 1 is a schematic side elevation view, partially in section, showing the forming station of production apparatus employed in the processes of the present invention, with juxtaposed webs passing through a fluting die assembly;

FIGURES 2, 3 and 4 are fragmentary enlarged, cross-sectional side elevation views of the fluting die assembly of FIGURE 1, showing three successive positions of the fluting dies employed in producing cups according to the present invention;

FIGURE 5 is a side elevation view, partially in section, of a stack of fluted cups formed by the processes of the present invention;

FIGURE 5A is an enlarged fragmentary cross-sectional side elevation view of a portion of the stack of cups shown in FIGURE 5;

FIGURE 6 is a similar enlarged fragmentary cross-sectional side elevation view of a stack of cups produced by another process of the present invention;

FIGURE 7 is a perspective view of a package incorporating features of the present invention, partially disassembled; and FIGURE 8 is a schematic plan view showing a portion of the package of FIGURE 7 unrolled, flattened and used as a unitary baking sheet.

Fluting die assembly

The stamping dies employed in producing unitary stacks of fluted receptacles by the methods of the present invention are illustrated in FIGURES 1 through 4. As shown in FIGURE 1, a number of strips or webs 20 of the materials from which each nested stack of fluted cups is to be formed are drawn from reels 22 past tensioning rollers 24 and one or more aligning guide rollers if desired (not shown) into face-to-face juxtaposition between capstan means such as the pinch rollers 26.

The pinch rollers 26 provide longitudinal driving force drawing the strips endwise from reels 22, and the juxtaposed strips are thus urged forwardly, preferably continuously, into the cutting and fluting die assembly 28 shown in the enlarged fragmentary sectional views of FIGURES 2, 3 and 4.

During each operating cycle of the die assembly 28, the telescoping fluting dies sever a stack of sections from the juxtaposed strips 20, and form them into a nested stack 30 of fluted-wall receptacles such as the baking cups shown in the drawings.

Web materials

As shown in FIGURES 5A and 6, the unitary stacks 30 of fluted receptacles formed by the methods of the present invention all incorporate at least one receptacle, preferably the next to the outermost one, which is formed of thin metallic foil. In the enlarged sectional side elevation view of FIGURE 5A, the next to the outermost cup 32 is formed of thin metallic foil, preferably from 0.0007″ to 0.0010″ in thickness. In the similar enlarged sectional side elevation view of FIGURE 6, the next to the outermost cup 32 and each cup 38 alternately stacked inwardly throughout the entire stack 30 of fluted cups is formed of thin sheet metallic foil material, with both the innermost and outermost cups 40 and 36, and all of the remaining interleaved cups 42 being formed of paper or other porous material.

When at least one of the stacked cups, such as the next to the outside cup 32, is formed of metallic foil material, as shown in FIGURE 5A, the entire stack of cups is maintained in its concave configuration by the stiffening and reinforcing effect of this single foil cup. When the stack 30 is stored on a shelf above a kitchen sink or stove and thus exposed to warm, moist, rising air, such a foil cup 32 impedes or prevents the absorption of water vapor passing from the outside of the stack of nested cups toward its center.

In the stack of fluted cups shown in FIGURE 6, where each second cup 32 and 38 is formed of thin metallic foil, all of these foil cups have a desirable stiffening and reinforcing effect tending to retain all of the nested cups in their fluted cup shape. These interleaved metallic foil cups also prevent the absorption of water vapor from the atmosphere by any of the non-metallic cups interleaved between them, since only the edges of the interleaved non-metallic cups are exposed to water vapor in the atmosphere.

Thus, in the cups stacks 30 of both FIGURES 5A and 6, the outer non-metallic cup 36 and the next outermost metallic foil cup 32 form the outermost portions of both stacks. In the stack of FIGURE 5A, all of the remaining cups are formed of non-metallic and preferably porous material such as "27-pound" paper, impregnated with a low friction impregnant such as dry wax to increase its weight to that of "30-pound" paper, for example. In the interleaved stack shown in FIGURE 6, the outermost cup 36 and the innermost cup 40 are both formed of such non-metallic sheet material, while the remaining cups between these two cups 36 and 40 are formed alternately of foil cups 32 or 38 and of non-metallic cups 42.

Aluminum foil between 0.0007″ and 0.0010″ thick is well suited to form cups 32 and 38, and may be color-coated in many bright attractive colors. Foils of other metals and alloys may be used if desired.

The non-metallic sheet material such as porous wax-impregnated paper, forming layers 34, 36, 40 and 42, acts as a low-friction layer interposed between each layer of metallic foil and the adjacent metal surface of the fluting die or of another foil layer. These low-friction layers thus guide and facilitate the sliding surface readjustment of the foil layers during the fluting operation, while also blocking any tendency of the metallic foil to swage, curl or adhere to any adjacent metal surface.

If desired, these low-friction layers may be formed as coatings of "Teflon" (polytetrafluoroethylene), or silicones or similar low-friction materials applied directly to the surfaces of the metallic foil layers. However, interleaved layers of wax-impregnated paper have been found to combine the advantages of low friction with blocking deflection of curling ridges of the foil layers, affirmatively preventing undesired locking or swaging of adjacent foil regions with each other or with the fluting die surfaces.

Heating of the stacks 30 following the fluting operation appears to produce a "setting" of the wax impregnant in porous layers 34 and 36; acting together with the stiffening and moisture barrier effect of the first foil cup 32, the stacks 30 maintain their original shape, and do not spread into the hexagonal or square shape of any container which confines them.

In the bulk packing of such nested stacks of baking cups for use by commercial bakeries, packing tubes and cylinders are not required for the stacked baking cups of this invention because of their long-term shape retention characteristics, producing substantial economies in packaging labor and materials.

Severing and flute forming

The successive views of FIGURES 2, 3 and 4 show the severing and flute forming die assembly 28 in three successive positions occurring during each operating cycle of the die assembly. A fixed socket die 46 and a die housing 49 guiding movable telescoping die members 48, 50 and 52 form the two "halves" of the die assembly 28. The pinch rollers 26 may revolve intermittently between cycles of die assembly 28, but they preferably revolve continuously, causing constant forward feed motion of the juxtaposed strips 20 as they approach the die assembly 28. The closing of the two halves 46 and 49 of the die assembly 28 during each cycle halts the forward progress of the strips 20 therethrough. This produces the sidewise buckling 21 shown in FIGURE 1 until the die assembly 28 opens at the end of its cycle. After the die assembly 28 opens, the juxtaposed strips 20 will drop between the halves of the die assembly 28 by the force of gravity, bringing them into position for the next fluting cycle.

This is the condition shown in FIGURE 2, where the juxtaposed strips or webs 20 are positioned between the open halves 46 and 49 of the die assembly 28. As the die assembly 28 begins to close, these strips 20 are urged to the right by an anvil 48, mounted in the die housing 49 facing the socket die 46, against the sharpened edge of a ring-shaped severing blade 44. This blade 44 is positioned by an adjustable backing wedge ring 45 in the round periphery of the concavely tapered or horn-shaped socket die 46. Anvil 48 is moved toward severing blade 44 until the central circular sections 29 of all of the strips 20 are severed by the blade 44, as suggested in FIGURE 3, forming a stack of correspondingly shaped juxtaposed layer sections 29 aligned symmetrically with the centerline axis 27 of the die assembly 28. The anvil 48 is formed as a tubular member having a flat end conforming substantially to the shape of ring-shaped severing blade 44, and in its extended position anvil 48 bears against the sharp edge of severing blade 44 to provide the severing action desired. If desired, anvil 48 may be provided with a ring-shaped recess or step aligned for telescoping overlapping with blade 44 to provide positive shearing of sections 29 from strips 20.

Within the ring-shaped anvil 48 is positioned a telescopingly movable ring die 50 with a chamfered or "S-curved" fluting die surface 51 facing the cavity of the socket die 46. A telescoping ram 52 is positioned within the ring die 50, and as shown in FIGURE 2 the ram 52 is provided with a substantially flat leading edge and a tapered fluted side wall. This chamfered fluted surface 51 of ring die 50 fits within an incurving portal portion 54 of the socket die 46 (FIGURE 3), while the fluted tapered side wall of the ram 52 fits within the fluting cavity portion 56 of the concave socket die 46, as illustrated in FIGURES 3 and 4.

The socket die 46 therefore provides a smoothly converging forming passage with longitudinally extending wavy or corrugated flutes mating with those of ring die 50 and ram 52, and extending from the rim of incurving portal portion 54 through fluting cavity 56 to a delivery aperture 57 forming the exit of die 46, opening into a delivery conduit 58 (FIGURE 3).

As shown in FIGURES 3 and 4, the cup forming operation is performed primarily by the telescoping ram 52 moving out of ring die 50 toward the fluted hollow cavity 56 in the socket die 46 depressing the central portion of the severed juxtaposed layer sections 29 toward the rear aperture of the socket die 46.

The wall-fluting operation forming tapered corrugated flutes in the walls of the resulting nested stacked cups 30 is performed initially by the co-action of the ring die 50 with portal section 54 of the socket die 46. The corrugated chamfered fluting die surface 51 of ring die 50 interfits with the corrugated portal surface 54 of socket die 46, forming a converging conical aperture with increasingly deep wavy corrugations through which the peripheral walls of the severed layer sections slide edgewise while they travel through the die assembly 28, as shown in FIGURE 3. The fluted corrugations of the portal section 54 are aligned with and merge smoothly with the corresponding fluted corrugations in the converging or conically tapered cavity portion 56 of socket die 46. Thus the movement of ram 52 urging the central portions of the juxtaposed layer sections progressively through successive diametral planes of the socket die 46 draws the peripheral walls of the juxtaposed layer sections 29 through the corrugated passage bounded by ring die 50 and portal 54 to urge these peripheral walls of the juxtaposed layer sections inwardly, from their original radial position in the same plane with the central portions of the layer sections 29, toward their standing fluted side wall position indicated in FIGURE 5, in which they form the fluted walls of the nested stacked cup-shaped receptacles.

As the ram 52 continues its passage through fluting die 46, the side walls are drawn progressively closer together and given their final fluted shape by being drawn between the corrugated flutes in the tapered cavity portion 56 of fluting die 46 and the corresponding fluted ridges and depressions on the side walls of ram 52. This final wall fluting action occurs as the ram moves from the position shown in FIGURE 3 toward the delivery position shown in FIGURE 4, where the nested stack 30 of fluted-wall concave cups has been drawn entirely through the fluting die and ejected through its delivery aperture 57 into delivery conduit 58.

Heating of formed stacks

Each nested stack 30 of fluted cup-shaped receptacles delivered by the fluting die assembly 28 is ejected directly into the delivery conduit 58 shown in FIGURES 1–4, which has an internal diameter slightly larger than the diameter of delivery aperture 57 (FIGURE 3). The nested fluted stacks 30 pass successively along and through the conduit 58, which acts to confine their outer peripheries and thus maintains them in their nested condition, aided by their juxtaposition with the other stacks 30 successively formed by each operating cycle of die assembly 28.

The natural resilience of each nested stack ejected by the die assembly 28 produces a slight expansion of the rims of each nested stack as it is ejected through aperture 57, and this expansion brings its outer periphery into contact with the interior wall of conduit 58, and prevents the stack from being drawn back into the fluting die 46 as ram 52 withdraws from the ejection position shown in FIGURE 4 toward the initial position shown in FIGURE 2, to begin the next cycle. The resilient engagement of the wall rims of each ejected stack of cups 30 with the wall of conduit 58 maintains the stack in the transverse orientation shown in FIGURE 2 after its ejection from the die assembly 28 and each ejected stack is moved along the delivery conduit 58 by the ejection of each succeeding stack 30, as indicated in FIG. 1.

As the stacks of fluted cups are moved down the delivery conduit 58, they pass within a heating zone therein produced by a heater 60 formed for example of Calrod heating elements connected to a suitable power source and enclosed within an insulating jacket of asbestos or other material to prevent injuries to onlookers.

The action of the heating zone produced by the heater 60 is believed to be two-fold: the heating of the fluted stacks of cups apparently toughens the metallic foil, changing its grain structure slightly to alleviate any residual stress caused by the fluting operation. In addition, in the fluted regions of each stack, the heating of the wax impregnant in the paper layers interleaved between the metallic foil layers, coupled with the subsequent cooling of the stack, apparently has the effect of "setting" the interleaved paper cup-shaped sections in their fluted cup configuration, possibly by softening and then hardening the wax impregnant.

The overall effect of the passage of the fluted stacks 30 through this heating zone therefore appears to be to relieve internal stresses and to minimize the resilient "memory" of the fluted cups so they no longer tend to spread and flatten toward their original flat sheet configuration. The cups thus maintain themselves neatly nested in the stacks ejected by the fluting die assembly.

Combination package

A combined package is shown in FIGURE 7, incorporation a stack of cups 72 witth a block of pre-mixed and ready-to-bake baking dough enclosed in a single outer container which may be used both for storage and as a baking sheet. In this combined package the outer cover 62 is formed of a heat resistant central paper core 64 covered on both sides by metallic foil layers 66, and is rolled to form a cylinder with a seam 67 joined by heat or suitable adhesives to enclose the contents of the container. The ends of the cylinder are enclosed by end caps 68 and 70, shown with crimped, milk bottle cap type end closures in FIGURE 7. The caps 68 and 70 may also be formed as metal disks with their rims crimped over the ends of the cover 62.

As shown in FIGURE 7, a stack of fluted baking cups 72 is positioned in one end of the cylinder formed by the rolled cover 62. The remainder of the cylinder is normally filled by a block of pre-mixed and ready-to-bake baking dough, for use in baking rolls, cup cakes, muffins or the like.

As shown in FIGURE 8, the outer cover 62 may be unrolled and flattened after the package is opened, and the flattened cover 62 may be used as a baking sheet on which the stacked baking cups of the stack 72 may be unstacked and arranged as shown in FIGURE 8. The ready-to-bake dough in the remainder of the package may then be placed in the baking cups, which provide with baking sheet 62 an easily usable and disposable package for both storing and baking of the contents.

The metallic foil cups of this invention are unusually well adapted for use in this combination package, since their shape retention characteristics eliminate the need for recess-cavity muffin tins and allow them to be used alone on baking sheets such as the sheet formed by the cover 62.

I claim:

1. A nested stack of concave, fluted-wall cup-shaped receptacles formed of juxtaposed layers of sheet material, each formed layer incorporating a bottom wall and a fluted side wall in which the flutes of each layer are die-formed and conform in nested relation with the flutes of the next adjacent layers, each layer constituting an individual, non-adherent receptacle being independently separable from the stack, with at least one receptacle comprising a layer of metallic foil and with at least the next layers adjacent to the inner and outer sides of said one metallic foil layer comprising non-metallic low-friction material, there being a plurality of receptacles embraced by said one metallic foil receptacle.

2. The nested stack of receptacles defined in claim 1 wherein the metallic foil receptacle forms a surrounding stiffener and moisture barrier for the remaining embraced receptacles of the stack retarding the passage of moisture through the non-metallic, low friction material.

References Cited

UNITED STATES PATENTS

| | | | |
|---|---|---|---|
| 1,574,259 | 2/1926 | Sarff | 220—65 |
| 2,218,388 | 10/1940 | Twombly | 206—65 |
| 2,407,118 | 9/1946 | Waters | 220—65 |
| 2,947,441 | 8/1960 | Brannan | 220—63 |
| 3,078,006 | 2/1963 | Price et al. | 220—64 |
| 3,143,241 | 8/1964 | Howell | 220—64 |
| 3,165,201 | 1/1965 | Woodman | 206—56 |

WILLIAM T. DIXON, JR., Primary Examiner

U.S. Cl. X.R.

99—172; 220—64, 97; 229—1, 3